(12) United States Patent
Izumi et al.

(10) Patent No.: US 11,150,685 B2
(45) Date of Patent: Oct. 19, 2021

(54) ELECTRONIC APPARATUS AND METHOD OF CONTROLLING ELECTRONIC APPARATUS

(71) Applicant: Sony Semiconductor Solutions Corporation, Kanagawa (JP)

(72) Inventors: Keita Izumi, Kanagawa (JP);
Toshimasa Shimizu, Kanagawa (JP);
Katsumi Takaoka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/340,865

(22) PCT Filed: Nov. 7, 2017

(86) PCT No.: PCT/JP2017/040021
§ 371 (c)(1),
(2) Date: Apr. 10, 2019

(87) PCT Pub. No.: WO2018/116666
PCT Pub. Date: Jun. 28, 2018

(65) Prior Publication Data
US 2019/0235565 A1    Aug. 1, 2019

(30) Foreign Application Priority Data
Dec. 22, 2016 (JP) .............................. JP2016-249618

(51) Int. Cl.
*G06F 1/04* (2006.01)
*G06F 1/3234* (2019.01)
(Continued)

(52) U.S. Cl.
CPC ................ *G06F 1/04* (2013.01); *G06F 1/324* (2013.01); *G06F 1/325* (2013.01); *G06F 1/3215* (2013.01);
(Continued)

(58) Field of Classification Search
CPC ..... G06F 1/00; G06F 1/04; G06F 1/08; G06F 1/10; G06F 1/3215; G06F 1/3231;
(Continued)

(56) References Cited

U.S. PATENT DOCUMENTS

2015/0121104 A1*  4/2015 Kinouchi ............. G06F 1/3206
                                                    713/322
2015/0237228 A1*  8/2015 Okuzono ............. G06K 15/406
                                                    358/1.13

FOREIGN PATENT DOCUMENTS

JP      2015-082276 A      4/2015
JP      2015-152845 A      8/2015
JP      2016-062541 A      4/2016

* cited by examiner

*Primary Examiner* — Lincoln D Donovan
*Assistant Examiner* — Dave Mattison
(74) *Attorney, Agent, or Firm* — Michael Best & Friedrich LLP

(57) ABSTRACT

It is desirable to reduce power consumption without reducing a function in an electronic apparatus operating in a plurality of modes different in power consumption from one another.

A processor operates in a normal mode, in which power consumption is higher, of two modes different in power consumption from each other, and stops operation in a power saving mode, in which the power consumption is lower, of the two modes. A control section outputs a power saving mode control command instructing an increase or decrease of a supply electric power to a digital circuit different from the processor in the power saving mode. A power source managing integrated circuit increases or decreases the supply electric power to the digital circuit in accordance with the power saving mode control command, and outputs the increased or decreased supply electric power.

18 Claims, 14 Drawing Sheets

(51) Int. Cl.
*G06F 15/78* (2006.01)
*G06F 1/3231* (2019.01)
*G06F 1/324* (2019.01)
*G06F 1/3215* (2019.01)
*G06F 1/3296* (2019.01)

(52) U.S. Cl.
CPC .......... *G06F 1/3231* (2013.01); *G06F 1/3234* (2013.01); *G06F 1/3243* (2013.01); *G06F 1/3296* (2013.01); *G06F 15/78* (2013.01); *Y02D 10/00* (2018.01)

(58) Field of Classification Search
CPC ...... G06F 1/3234; G06F 1/324; G06F 1/3243; G06F 1/325; G06F 1/3296; G06F 15/78; G11C 7/00; G11C 7/22; H03K 5/00; H03K 5/135; Y02D 10/00; Y02D 10/12
USPC ......................................................... 327/291
See application file for complete search history.

ELECTRONIC APPARATUS AND METHOD OF CONTROLLING ELECTRONIC APPARATUS

TECHNICAL FIELD

The present technology relates to an electronic apparatus and a method of controlling the electronic apparatus. More particularly, the present technology relates to an electronic apparatus which controls power consumption, and a method of controlling the electronic apparatus.

BACKGROUND ART

In recent years, along with the progress of the miniaturization and the reducing power consumption of a digital circuit due to the shrink of the semiconductor process, a rate at which a leakage current occupies in the consumption current of the digital circuit has been increased. Owing to the increase in the leakage current, it may be impossible to sufficiently reduce the consumption current only by the control causing a voltage of the digital circuit to be reduced. Then, there has been proposed a system with which when an operation proceeds from a normal mode to a standby mode, in a digital circuit in which a leakage current is caused to flow, circuits other than a wake-up function section are stopped to reduce the power consumption (for example, refer to PTL 1). With this system, the wake-up function section performs an increase and a decrease of a drive voltage, and supply and cut-off of the drive voltage at the time of the standby mode.

CITATION LIST

Patent Literature

[PTL 1]
Japanese Patent Laid-Open No. 2016-62541

SUMMARY

Technical Problem

In the related art describe above, since in the standby mode, the circuits other than the wake-up function section stop, the power consumption can be reduced as compared with the case where only the voltage control is performed. However, since the wake-up function section operates, as the function of the wake-up function section is further upgraded, the power consumption is increased. Although if the wake-up function section stops, then, the power consumption can be sufficiently reduced, in the standby mode, it may be impossible to perform the complicated control such as the control or a cut-off for the drive voltage, so that the function is reduced. In such a manner, with the related art described above, it is difficult to reduce the power consumption without reducing the function.

The present technology has been created in the light of such a situation, and it is therefore desirable to reduce power consumption without reducing a function in an electronic apparatus which operates in a plurality of modes different in power consumption from one another.

Solution to Problem

The present technology has been made in order to solve the problem described above, and a first aspect of the present technology is an electronic apparatus and a method of controlling the electronic apparatus. The electronic apparatus includes: a processor operating in a normal mode in which power consumption is higher, of two modes different in power consumption from each other, and stopping operation in a power saving mode in which the power consumption is lower, of the two modes; a control section outputting a power saving mode control command instructing an increase or decrease of a supply electric power to a digital circuit different from the processor in the power saving mode; and a power source managing integrated circuit increasing or decreasing the supply electric power to the digital circuit in accordance with the power saving mode control command, and outputting the increased or decreased supply electric power. As a result, an action that in the power saving mode, the power saving mode control command is outputted by the control section is brought.

In addition, in the first aspect, the control section may output the power saving mode control command instructing supply or cut-off of the supply electric power. As a result, an action that in the power saving mode, the supply electric power is supplied or cut off is brought.

In addition, in the first aspect, the power source managing integrated circuit may output an electric power responding to a power source voltage as the supply electric power, and the control section may output the control command instructing an increase or decrease of a voltage value of the power source voltage. As a result, an action that the voltage value of the power source voltage is controlled in the power saving mode.

In addition, in the first aspect, the processor may output a normal mode control command instructing an increase or decrease of a supply electric power to the processor and the digital circuit in the normal mode, and the power source managing integrated circuit may increase or decrease the supply electric power to the processor and the digital circuit in accordance with one of the normal mode control command and the power saving mode control command. As a result, an action that in the normal mode, the normal mode control command is outputted by the processor is brought.

In addition, in the first aspect, the electronic apparatus may further include a selector selecting the normal mode control command in the normal mode and outputting the normal mode control command to the power source managing integrated circuit, and selecting the power saving mode control command in the power saving mode and outputting the power saving mode control command to the power source managing integrated circuit. As a result, an action that one of the normal mode control command and the power saving mode control command is selected is brought.

In addition, in the first aspect, the control section, in a case where an operation of the processor stops, may output a command instructing a decrease of the supply electric power as the power saving mode control command, and in a case where a predetermined returning condition for returning to the normal mode is fulfilled, output a command instructing an increase of the supply electric power as the power saving mode control command. As a result, an action that when the operation of the processor stops, the supply electric power is decreased, and when the returning condition is fulfilled, the supply electric power is increased is brought.

In addition, in the first aspect, the electronic apparatus may further include a register holding the power saving mode control command. The control section may read out the power saving mode control command from the register. As a result, an action that the power saving mode control command is read out from the register is brought.

In addition, in the first aspect, the electronic apparatus may further include a clock supplying section supplying a clock signal to the processor. The control section may control a frequency of the clock signal in the power saving mode. As a result, an action that the frequency of the clock signal is controlled in the power saving mode is brought.

In addition, in the first aspect, the electronic apparatus may further include a sensor data collecting section collecting sensor data from the digital circuit in the power saving mode. The digital circuit may include a sensor device generating the sensor data. As a result, an action that in the power saving mode, the sensor data is collected is brought.

Advantageous Effects of Invention

According to the present technology, an excellent effect that in the electronic apparatus operating in a plurality of modes different in power consumption from one another, the power consumption can be reduced without reducing the function can be offered. It should be noted that the effect described here is not necessarily limited, and any of the effects described in the present disclosure may be valid.

DESCRIPTION OF EMBODIMENTS

Hereinafter, a description will be given with respect to modes for carrying out the present technology (hereinafter, referred to as embodiments). The description will be given in accordance with the following order.

1. First Embodiment (an example in which a power source managing unit generates a control command in a sleep mode)

2. Second Embodiment (an example in which the power source managing unit generates the control command in the sleep mode, and a clock is controlled)

3. Third Embodiment (an example in which the power source managing unit generates the control command in the sleep mode, and a sensor data collecting section collects sensor data)

4. Application Examples

1. First Embodiment

[Example of Configuration of Electronic Apparatus]

Figure 1:
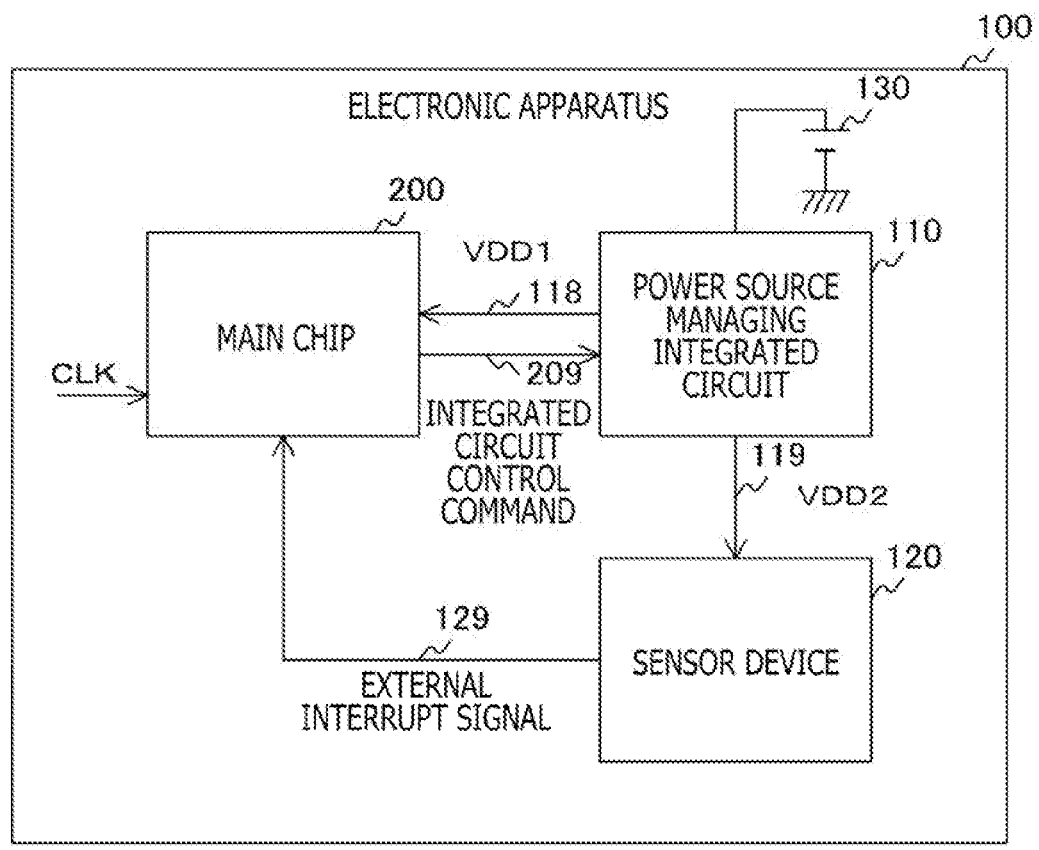
FIG. 1 is a block diagram illustrating an example of a configuration of an electronic apparatus in a first embodiment of the present technology.

FIG. 1 is a block diagram illustrating an example of a configuration of an electronic apparatus 100 in an embodiment of the present technology. The electronic apparatus 100 is provided with a main chip 200, a power source managing integrated circuit 110, a sensor device 120, and a battery 130. A mobile apparatus such as a wearable device, a smartphone or a notebook personal computer, or the like is supposed as the electronic apparatus 100.

Main circuits and elements such as a processor and a memory are provided in the main chip 200. The main chip 200 generates an integrated circuit control command synchronously with a predetermined clock signal CLK and supplies the integrated circuit control command to the power source managing integrated circuit 110 through a signal line 209. Here, the integrated circuit control command is a command instructing an increase or a decrease of a supply electric power supplied by the power source managing integrated circuit 110. The integrated circuit control command, for example, includes at least one of a set value of a power source voltage supplied by the power source managing integrated circuit 110, or a command instructing the supply or cut-off of the power source voltage. The supply electric power responding to the voltage value of the power source voltage is increased or decreased by the control for the power source voltage.

The battery 130 stores the electric power by charging, and outputs the electric power by discharge.

The power source managing integrated circuit 110 controls the supply electric power in accordance with the integrated circuit control command. The power source managing integrated circuit 110 generates a power source voltage VDD1 by using the electric power from the battery 130, and supplies the power source voltage VDD1 to the main chip 200 through a signal line 118. In addition, the power source managing integrated circuit 110 generates a power source voltage VDD2 by using the electric power from the battery 130, and supplies the power source voltage VDD2 to the sensor device 120 through a signal line 119. The voltage values of the power source voltages VDD1 and VDD2 are controlled by using the integrated circuit control information. In addition, the supply or cut-off of the power source voltage VDD2 is performed by using the integrated circuit control information. It should be noted that the cut-off of the power source voltage VDD1 is performed by an internal circuit of the main chip 200.

The sensor device 120 measures a predetermined physical quantity. An acceleration sensor, an image sensor, a temperature sensor, a magnetic sensor, or the like is supposed as the sensor device 120. In a case where a measured value exceeds a predetermined threshold value, the sensor device 120 generates an external interrupt signal, and supplies the resulting external interrupt signal to the main chip 200 through a signal line 129. A method of utilizing the external interrupt signal will be described later.

It should be noted that although the electronic apparatus 100 is provided with only one sensor device 120, the electronic apparatus 100 may also be provided with two or more sensor devices. In addition, the electronic apparatus 100 can be provided with a circuit or an element other than the sensor device 120. For example, the electronic apparatus 100 can be provided with an external clock generator such as a crystal oscillator, a flash memory, or the like. The voltage which is applied to the circuit or the like other than a sensor device 120 is also controlled by the power source managing integrated circuit 110 similarly to the case of the sensor device 120.

[Example of Configuration of Main Chip]

Figure 2:
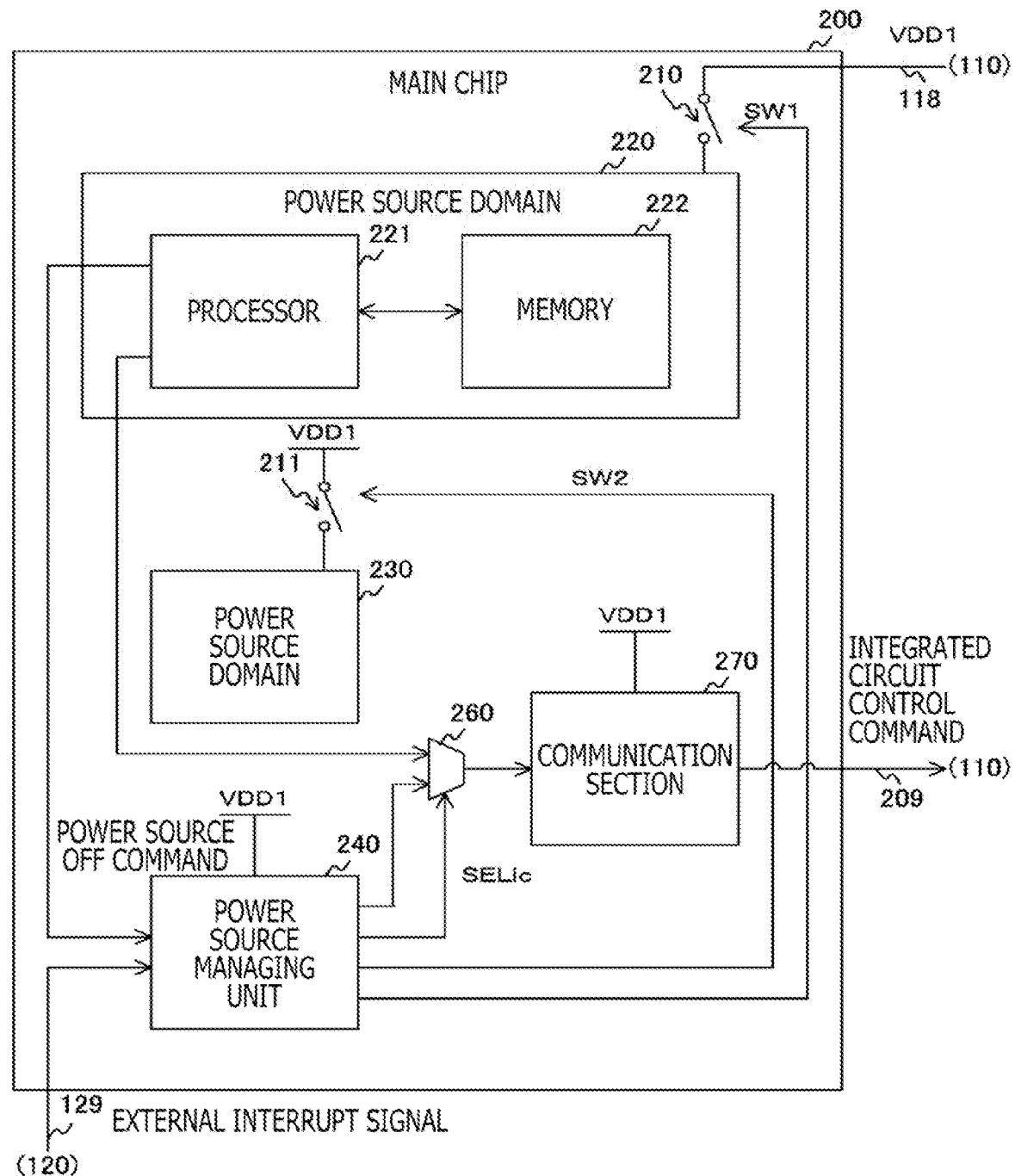
FIG. 2 is a block diagram illustrating an example of a configuration of a main chip in the first embodiment of the present technology.

FIG. 2 is a block diagram illustrating an example of a configuration of the main chip 200 in the first embodiment of the present technology. The main chip 200 is provided with switches 210 and 211, power source domains 220 and 230, a power source managing unit 240, a selector 260, and a communication section 270.

The switch 210 opens or closes a power source path between the power source domain 220 and the power source managing integrated circuit 110 in accordance with a switch control signal SW1 from the power source managing unit 240. The switch 211 opens or closes a power source path between the power source domain 230 and the power source managing integrated circuit 110 in accordance with a switch control signal SW2 from the power source managing unit 240.

The power source domain 220 is a domain which can supply or cut-off the power source independently of the power source domain 230. The power source domain 220 is provided with a processor 221 and a memory 222. Various circuits such as a digital signal processing circuit which processes image data or audio data, and a wireless baseband signal processing circuit are arranged in the power source domain 230.

It should be noted that although two power source domains 220 and 230 are provided as a power source domain which can cut off the supply of the power source, three or more such domains may be provided. In addition, only the power source domain 220 may be provided without providing the power source domain 230.

The processor 221 operates or stops in response to an operation mode of the electronic apparatus 100. A CPU (Central Processing Unit) or an MPU (Micro Processor Unit) is supposed as the processor 221.

Here, states of the electronic apparatus 100 can be classified into a plurality of operation modes different in power consumption from one another. For example, the operation modes of the electronic apparatus 100 include a normal mode in which the power consumption is relatively high, and a sleep mode in which the power consumption is relatively low. It should be noted that the sleep mode is an example of a power saving mode described in CLAIMS.

In addition, in the normal mode, an integrated circuit control command different from a control command of the sleep mode is generated. Hereinafter, the integrated circuit control command in the normal mode is referred to as a "normal mode control command," and the control command in the sleep mode is referred to as a "sleep mode control command."

The processor 221 operates in the normal mode, and stops operation in the sleep mode. In addition, the processor 221 generates the normal mode control command in the normal mode, and outputs the normal mode control command to the selector 260. Then, when a predetermined proceeding condition for proceeding to the sleep mode is fulfilled in the normal mode, the processor 221 generates a power source off command instructing the cut-off of the supply of the power source to the power source domain 220, and outputs the power source off command to the power source managing unit 240. The proceeding condition, for example, is such that a predetermined manipulation is performed by a user, or a period of time for which no manipulation is performed continues over a predetermined time or more.

The memory 222 temporarily holds data or the like which is used in a program executed by the processor 221.

The power source managing unit 240 generates the sleep control command in the sleep mode. When the power source managing unit 240 receives the power source off command (that is, proceeds to the sleep mode), the power source managing unit 240 cuts off the supply of the power source to the power source domain 220 in accordance with the switch control signal SW1.

In addition, when the power source managing unit 240 receives the power source off command, if necessary, the power source managing unit 240 cuts off the supply of the power source to the power source domain 230 in accordance with the switch control signal SW2. Whether or not in the sleep mode, the supply power source to the power source domain 230 is cut off is decided on the basis of a kind of an application to be executed, or a remaining electric power of the battery 130.

In addition, when the power source managing unit 240 receives the power source off command, the power source managing unit 240 causes the selector 260 to select the sleep mode control command in accordance with a selection signal SELic. Voltage values of the power source voltages VDD1 and VDD2, and the supply or the cut-off of the power source voltage VDD2 are instructed in accordance with the sleep mode control command. As a result, the supply electric power to the communication section 270, the power source domain 230, and the sensor device 120 increases or decreases. It should be noted that a circuit including a circuit within the power source domain 230, the communication section 270, and the sensor device 120 is an example of a digital circuit described in CLAIMS.

Then, after the power source managing unit 240 switches the selector 260 in accordance with the selection signal SELic, the power source managing unit 240 generates the sleep control command instructing the decrease of the supply electric power. Then, when a predetermined returning condition for returning from the sleep mode to the normal mode is fulfilled, the power source managing unit 240 generates the sleep control command instructing an increase of the supply electric power. Then, the power source managing unit 240 causes the selector 260 to select the normal mode control command in accordance with the selection signal SELic.

Here, the returning condition, for example, is such that a given time elapses after proceeding to the sleep mode, the external interrupt signal is inputted, or the like. The setting of the returning condition, for example, results in that when the given period of time elapses after proceeding to the sleep mode, when the measured value of the sensor device 120 such as the acceleration sensor exceeds a threshold value (that is, the external interrupt signal is generated), or the like, the returning function can be realized. Hereinafter, the sleep mode control command at the time of proceeding to the sleep mode is referred to as an "at-the-time-of-proceeding to sleep control command," and the sleep mode control command at the time proceeding to the normal mode is referred to as an "at-the-time-of-returning control command."

The selector 260 selects one of the normal mode control command and the sleep mode control command in accordance with the selection signal SELic, and supplies the selected one to the communication section 270.

The communication section 270 transmits the selected integrated circuit control command to the power source managing integrated circuit 110.

It should be noted that although the power source managing unit 240 cuts off the supply of the power source to the power source domains 220 and 230 in accordance with the switch control signals SW1 and SW2, respectively, the present technology is by no means limited to this configuration. For example, the power source managing integrated circuit 110 may supply individually the power source voltage to the power source domains 220 and 230, and the power source managing unit 240 may cut off the supply of the power source to the domains in accordance with the sleep mode control command.

[Example of Configuration of Power Source Managing Unit]

Figure 3:
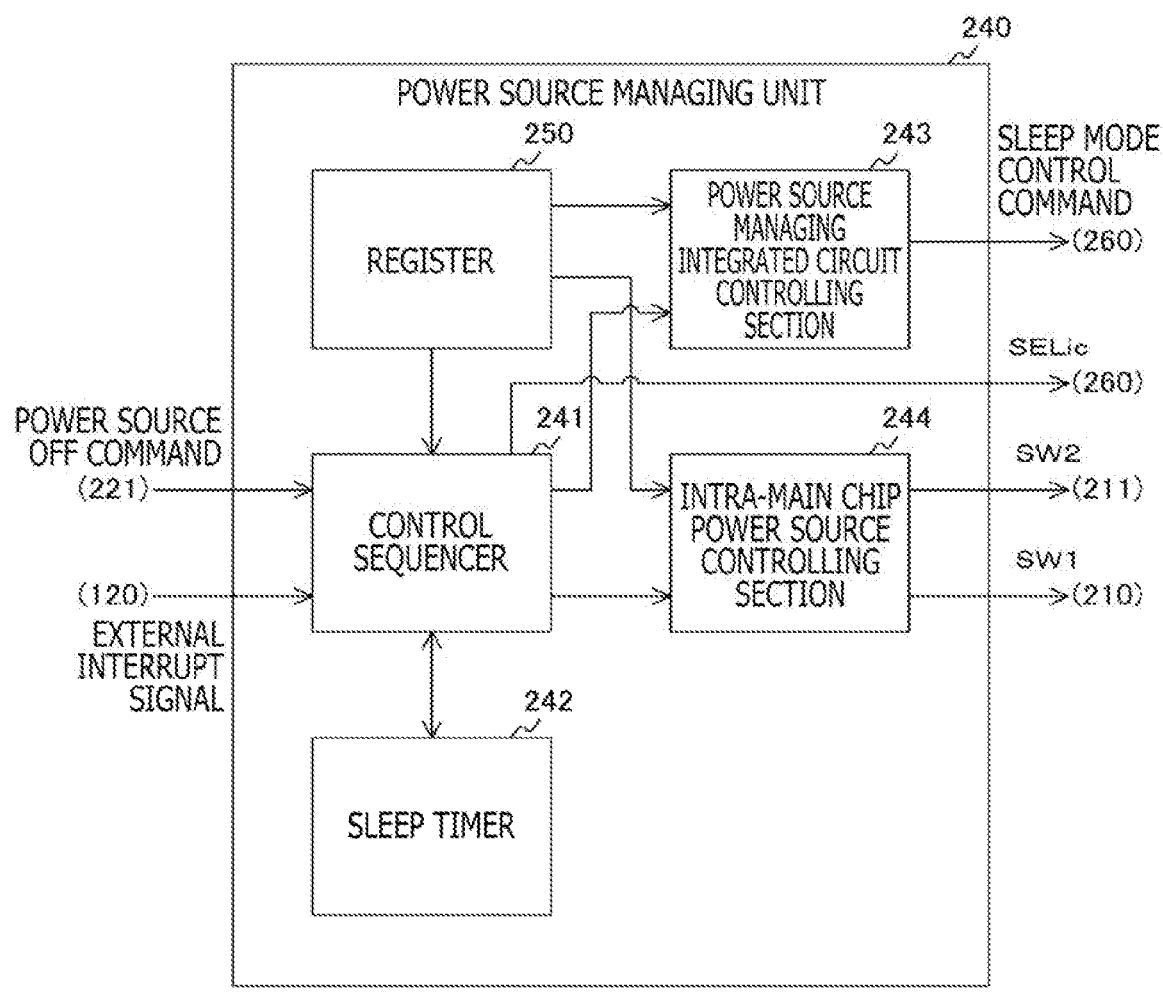
FIG. 3 is a block diagram illustrating an example of a configuration of a power source managing unit in the first embodiment of the present technology.

FIG. 3 is a block diagram illustrating an example of a configuration of the power source managing unit 240 in the first embodiment of the present technology. The power source managing unit 240 is provided with a register 250, a control sequencer 241, a sleep timer 242, a power source managing integrated circuit controlling section 243, and an intra-main chip power source controlling section 244.

The register 250 holds the at-the-time-of-proceeding to sleep control command and the at-the-time-of-returning control command, and various set information. The set information, for example, includes information representing whether or not the power sources of the power source domain 230 and the like are cut off in the sleep mode, a set value of the sleep timer 242, and information representing whether or not the operation mode returns to the normal mode in response to the external interrupt signal.

The control sequencer 241 controls the entire power source managing unit 240. The circuit of the control sequencer 241, for example, is made by an automatic design tool such as an RTL (Register Transfer Level). It should be noted that a designer may uniquely develop the control sequencer 241 without using the RTL design tool or the like. By performing the unique development, while the designer observes the voltage developed across the main chip 200 and the power source managing integrated circuit 110 and the power source supplying state, the designer can indirectly discover a configuration in which the power saving is obtained on the main chip 200 side in some cases.

When the control sequencer 241 receives the power source off command from the processor 221, the control sequencer 241 causes the selector 260 to select the sleep mode control command in accordance with the selection signal SELic. Then, the control sequencer 241 notifies the power source managing integrated circuit controlling section 243 and the intra-main chip power source controlling section 244 of the proceeding to the sleep mode, and resets a timer value of the sleep timer 242 to an initial value.

Then, the control sequencer 241 reads out the set information from the register 250 and determines whether or not the returning condition is fulfilled. In the case where the effect of the returning to the normal mode is set in response to the external interrupt signal, when the external interrupt signal is inputted, or the timer value of the sleep timer 242 exceeds the set value, it is determined that the returning condition is fulfilled. On the other hand, in the case where the effect of no returning to the normal mode is set in response to the external interrupt signal, when the timer value of the sleep timer 242 exceeds the set value, it is determined that the returning condition is fulfilled. It should be noted that the control sequencer 241 may determine that the returning condition is fulfilled at the time of input of an intra-chip interrupt signal which will be described later.

It should be noted that although the control sequencer 241 resets the sleep timer 242 at the time of the proceeding to the sleep mode, the present technology is by no means limited to this setting method. For example, the electronic apparatus 100 may not reset the sleep timer 242 when the operation mode proceeds to the sleep mode, and may hold the timer value T at the time of the proceeding, and may return to the normal mode when the timer value becomes T+dT. Here, dT is a set time from the proceeding to the sleep mode to the return.

In the case where the returning condition is fulfilled, the control sequencer 241 notifies the power source managing integrated circuit controlling section 243 and the intra-main chip power source controlling section 244 of the effect of the returning to the normal mode. Then, the control sequencer 241 causes the selector 260 to select the normal mode control command in accordance with the selection signal SELic.

The sleep timer 242 clocks a time which has elapsed after the proceeding to the sleep mode.

The power source managing integrated circuit controlling section 243 generates the sleep mode control command in the sleep mode. When the control sequencer 241 notifies the power source managing integrated circuit controlling section 243 of the effect of the proceeding to the sleep mode, the power source managing integrated circuit controlling section 243 reads out the at-the-time-of-proceeding to sleep control command from the register 250, and outputs the at-the-time-of-proceeding to sleep control command to the selector 260. Then, when the power source managing integrated circuit controlling section 243 is notified of the effect of the returning to the normal mode, the power source managing integrated circuit controlling section 243 reads out the at-the-time-of-returning control command from the register 250, and outputs the at-the-time-of-returning control command to the selector 260. It should be noted that the power source managing integrated circuit controlling section 243 is an example of a control section described in CLAIMS.

The intra-main chip power source controlling section 244 controls the supply of the power source to the power source domain within the main chip 200. The intra-main chip power source controlling section 244 causes the power source voltage VDD1 to be supplied to both the power source domains 220 and 230 in accordance with the switch control signals SW1 and SW2 in the normal mode.

In addition, when the intra-main chip power source controlling section 244 is notified of the effect of the proceeding to the sleep mode, the intra-main chip power source controlling section 244 reads out the set information from the register 250. Then, the intra-main chip power source controlling section 244 causes the supply of the power source to both the power source domains 220 and 230, or to only the power source domain 220 to be cut off in accordance with the set information. Then, when the intra-main chip power source controlling section 244 is notified of the effect of the proceeding to the normal mode, the intra-main chip power source controlling section 244 causes the power source voltage VDD1 to be supplied to both the power source domains 220 and 230 in accordance with the switch control signals SW1 and SW2.

Figure 4:
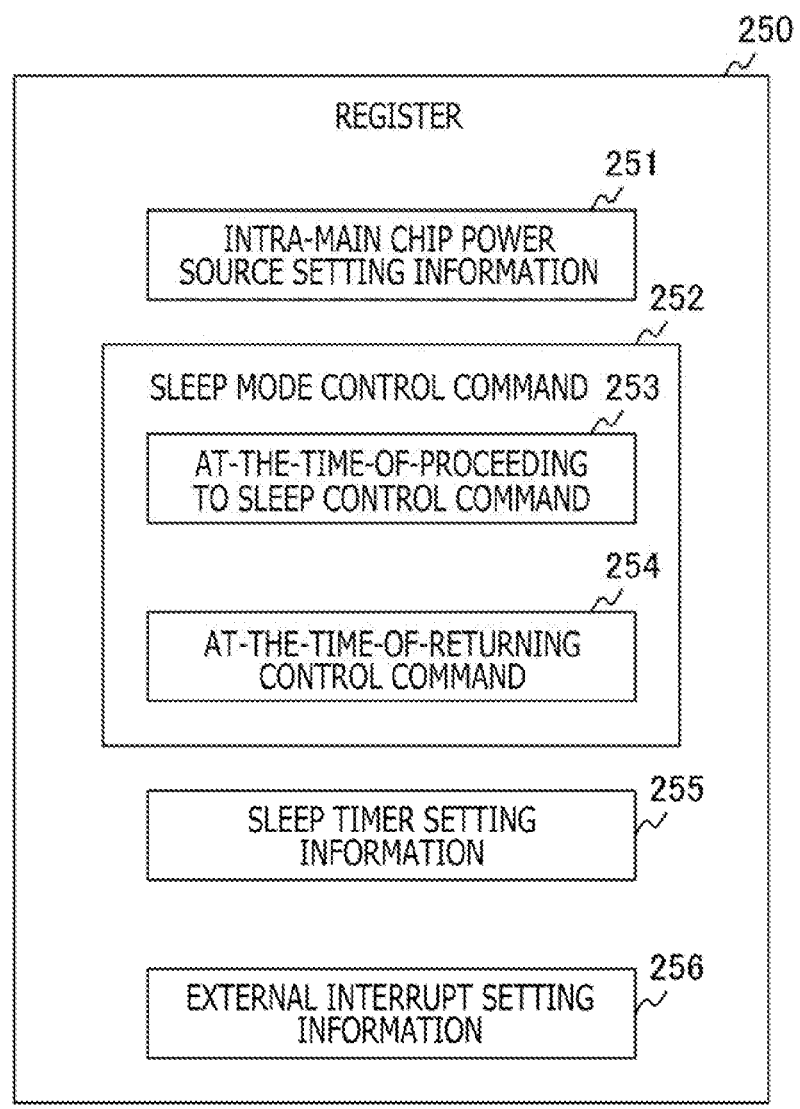
FIG. 4 is a diagram illustrating an example of data held in a register in the first embodiment of the present technology.

FIG. 4 is a diagram illustrating an example of the data held in the register 250 in the first embodiment of the present technology. The register 250 holds intra-main chip power source setting information 251, the sleep mode control command 252, the sleep timer setting information 255, and the external interrupt setting information 256. The sleep mode control command 252 includes an at-the-time-of-proceeding to sleep control command 253 and an at-the-time-of-returning control command 254.

The intra-main chip power source setting information 251 is information representing whether or not the power sources of the power source domain 230 and the like are cut off in the sleep mode. The sleep timer setting information 255 is information representing the set value of the sleep timer 242 during the returning from the sleep mode to the normal mode. The external interrupt setting information 256 is information representing whether or not the operation mode returns to the normal mode in response to the external interrupt signal.

[Example of Configuration of Power Source Managing Integrated Circuit]

Figure 5:
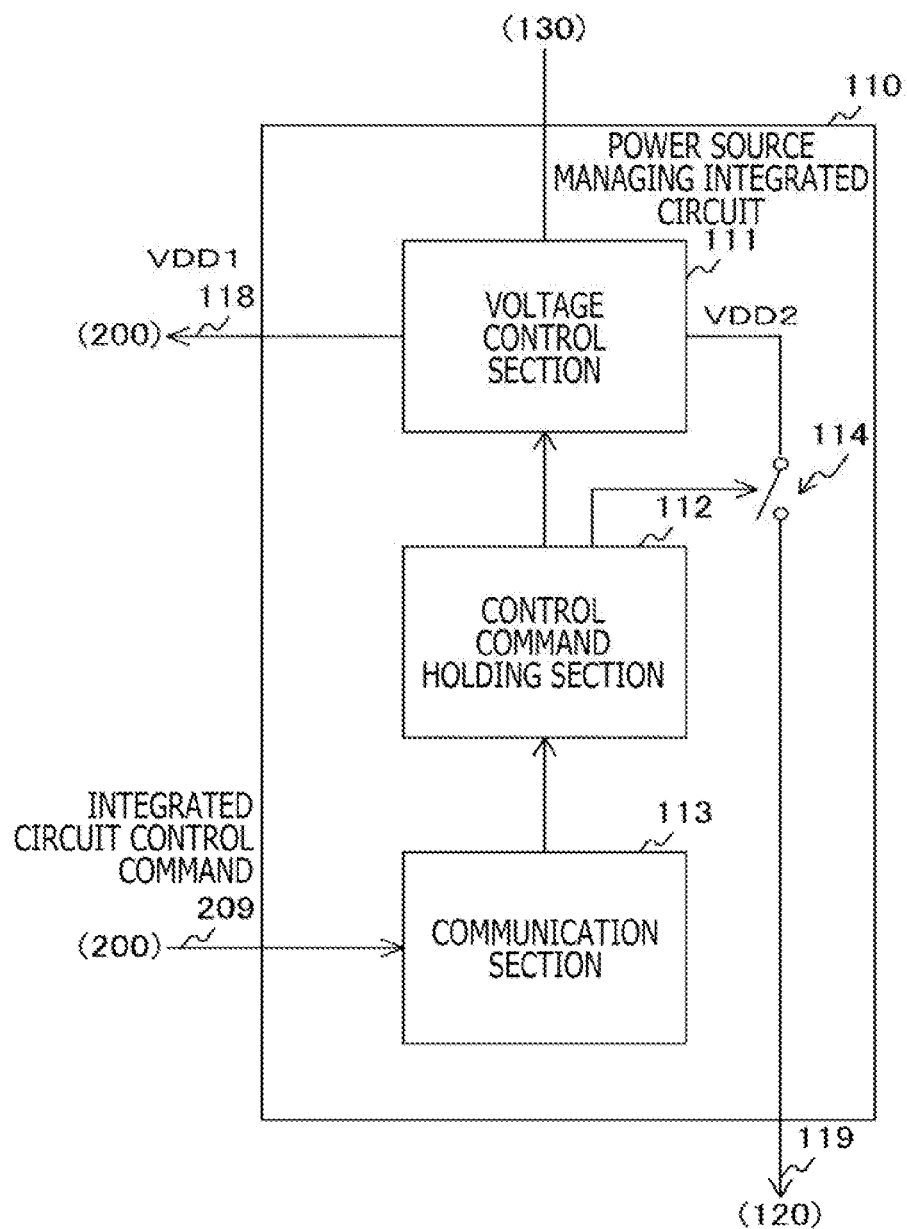
FIG. 5 is a block diagram illustrating an example of a configuration of a power source managing integrated circuit in the first embodiment of the present technology.

FIG. 5 is a block diagram illustrating an example of a configuration of the power source managing integrated circuit 110 in the first embodiment of the present technology. The power source managing integrated circuit 110 is provided with a voltage control section 111, a control command holding section 112, a communication section 113, and a switch 114.

The communication section 113 receives an integrated circuit control command issued from the main chip 200. The communication section 113 causes the control command holding section 112 to hold the received integrated circuit control command. The control command holding section 112 holds the integrated circuit control command.

The voltage control section 111 generates the power source voltages VDD1 and VDD2 by using the electric power from the battery 130, and controls the voltage value of the power source voltages VDD1 and VDD2 in accordance with the integrated circuit control command. The power source voltage VDD1 is supplied to the main chip 200, and the power source voltage VDD2 is supplied to the switch 114.

The switch 114 opens or closes a power source path between the voltage control section 111 and the sensor device 120 in accordance with the integrated circuit command.

[Example of Operation of Electronic Apparatus]

Figure 6:
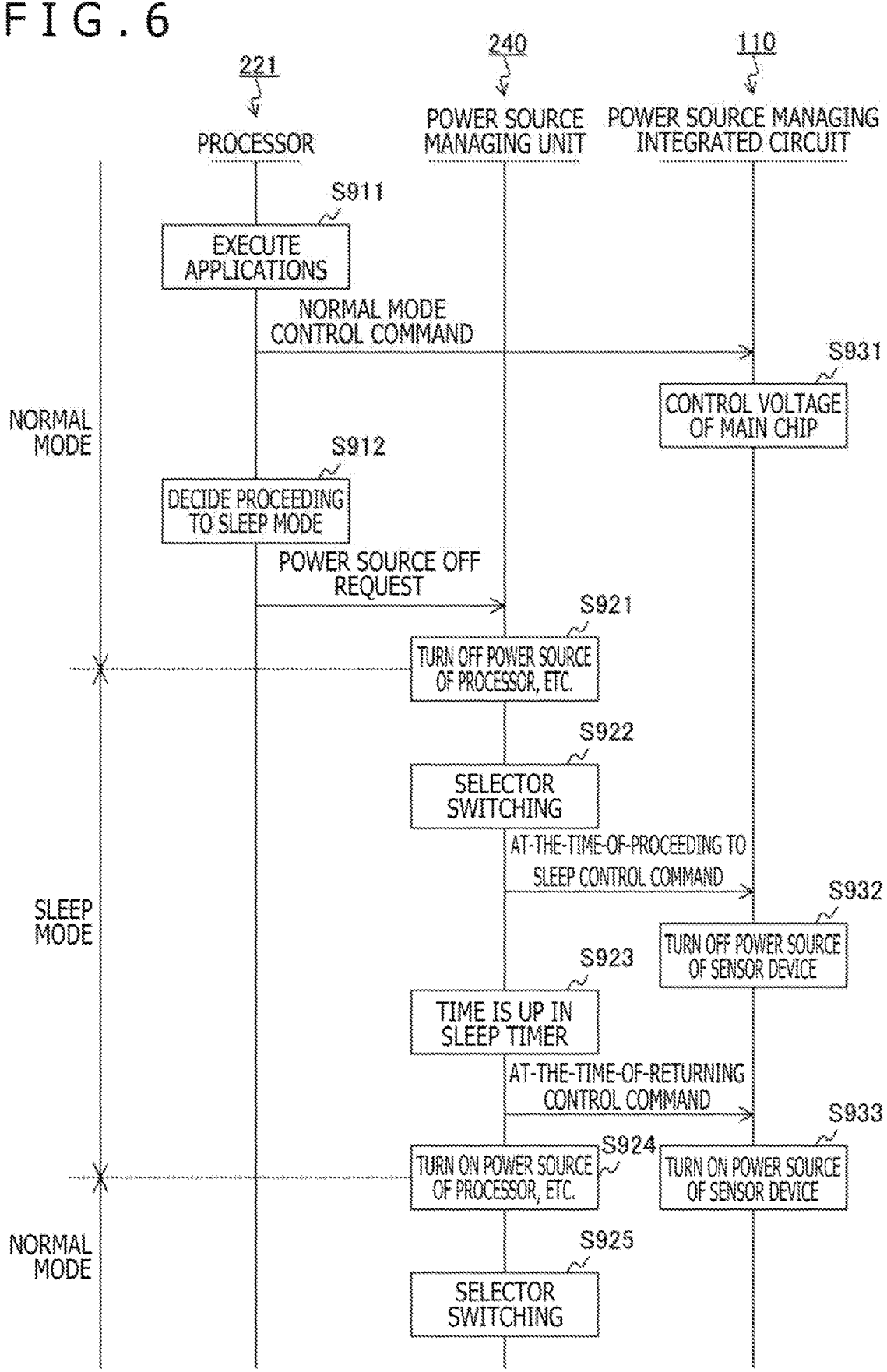
FIG. 6 is a sequence diagram illustrating an example of an operation of the electronic apparatus when a power source of a sensor device is controlled in the first embodiment of the present technology.

FIG. 6 is a sequence diagram illustrating an example of an operation of the electronic apparatus 100 when the power source of the sensor device 120 is controlled in the first embodiment of the present technology. It is supposed in the sequence diagram that the effect that the power source of the sensor device 120 is cut off in the sleep mode is set in the register 250.

The processor 221 executes various applications in the normal mode (Step S911). Then, the processor 221 generates the normal mode control command on the basis of an execution situation of the applications, and supplies the normal mode control command to the power source managing integrated circuit 110. The power source managing integrated circuit 110 controls the supply of the power source voltage VDD1 to the main chip in accordance with the normal mode control command (Step S931).

In addition, the processor 221 decides the proceeding to the sleep mode in accordance with the manipulation by the user or the like (Step S912), and supplies a power source off request to the power source managing unit 240. When the power source managing unit 240 receives the power source off request, the power source managing unit 240 turns off the power sources of the processor 221 and the like in accordance with the switch control signals SW1 and SW2 (Step S921). Then, the power source managing unit 240 controls the selector 260 to cause the selector 260 to be switched over to the power source managing unit 240 side (Step S922).

The power source managing unit 240 supplies the at-the-time-of-proceeding to sleep control command to the power source managing integrated circuit 110. The power source managing integrated circuit 110 turns off the power source of the sensor device 120 in accordance with the at-the-time-of-proceeding to sleep control command (Step S932).

Then, when the time is up in the sleep timer 242 (Step S923), the power source managing unit 240 generates the at-the-time-of-returning control command, and supplies the at-the-time-of-returning control command to the power source managing integrated circuit 110. The power source managing integrated circuit 110 turns on the power source of the sensor device 120 in accordance with the at-the-time-of-returning control command (Step S933). Then, the power source managing unit 240 turns on the power sources of the processor 221 and the like (Step S924), and controls the selector 260 to cause the selector 260 to be switched over to the processor 221 side (Step S925).

In such a manner, since in the sleep mode, the power source managing unit 240 generates the control command, the function of turning on or off the sensor device 120 in the sleep mode can be realized. In addition, the operation of the processor 221 is stopped, thereby enabling the power consumption at the time of the sleep mode to be reduced.

If a configuration such that in the sleep mode, the processor 221 generates the control command is adopted, then, for the purpose of executing the program generating the control command, the power sources of an arithmetic operation circuit, a bus, a memory and the like within the processor 221 need to be turned on. For this reason, it may be impossible to sufficiently decrease the power consumption in the processor 221.

In addition, if there is adopted a configuration such that the processor 221 turns off the power source of the sensor device 120 just before the proceeding to the sleep mode, and turns off the power source just after the return, then, there is the possibility that the operation of the sensor device 120 at the time of the return delays. The reason for this is because after a boot process is executed when the processor 221 returns to the normal mode, the program needs to be activated to generate the control command, and thus it takes a very long time until start of the generation of the control command.

It should be noted that in the case where an external clock generator is also controlled in addition to the sensor device 120, for example, the power source managing unit 240 may turn off the power source of the external clock generator at the time of the proceeding to the sleep mode, and may turn on the power source of the external clock generator in advance at the time of the return. As a result, the activation of the processor 221 can be speeded up.

Figure 7:
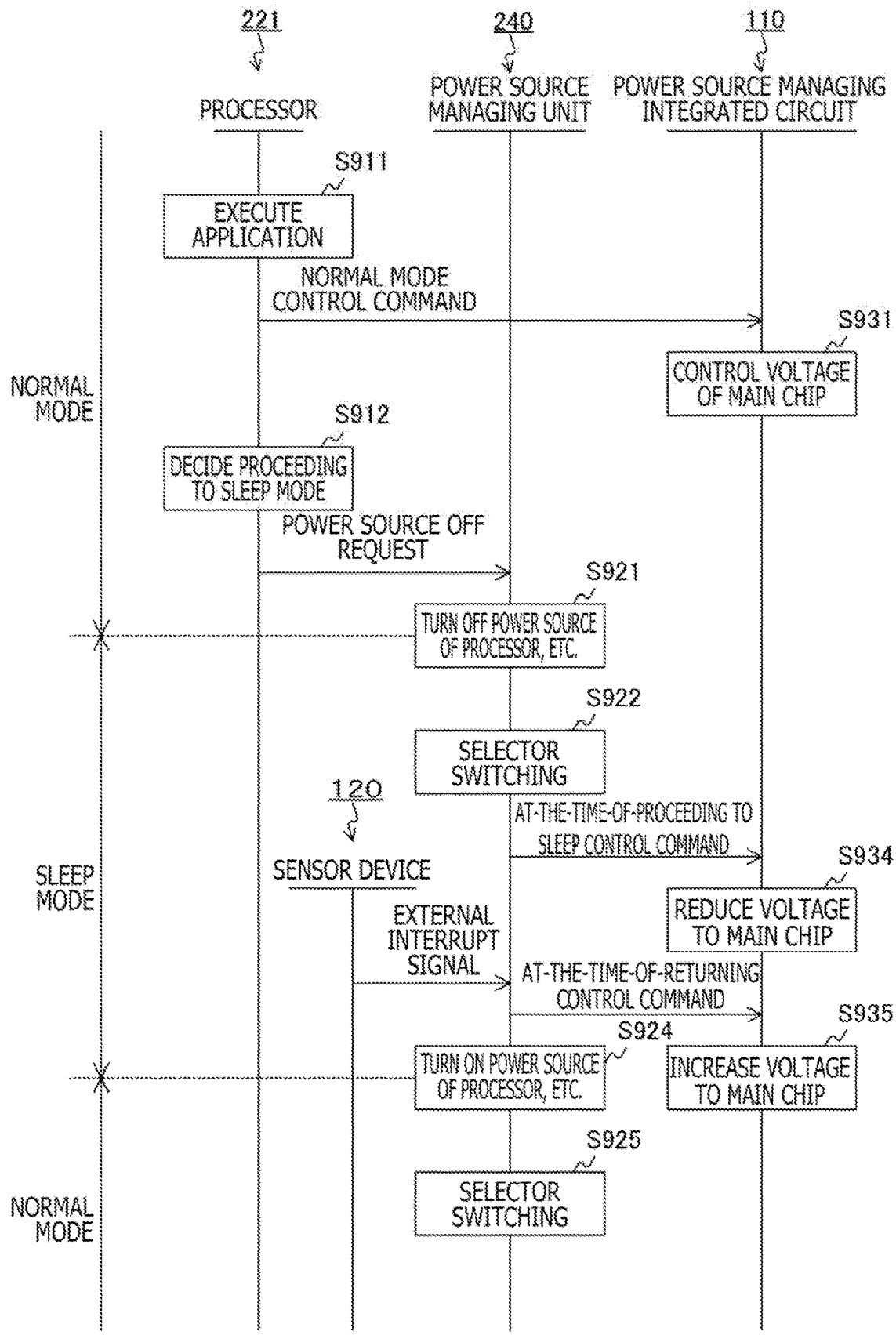
FIG. 7 is a sequence diagram illustrating an example of an operation of the electronic apparatus when a power source voltage is controlled in the first embodiment of the present technology.

FIG. 7 is a sequence diagram illustrating an example of an operation of the electronic apparatus 100 when the power source voltage is controlled in the first embodiment of the present technology. It is supposed in the sequence diagram that the effect that the operation mode returns to the normal mode in response to the external interrupt signal in the sleep mode, and the effect that the voltage value is reduced are set in the register 250.

The processor 221 executes the applications in the normal mode (Step S911), generates the normal mode control command on the basis of the execution situation, and supplies the normal mode control command to the power source managing integrated circuit 110. The power source managing integrated circuit 110 controls the supply of the power source voltage VDD1 to the main chip in accordance with the normal mode control command (step S931).

In addition, the processor 221 decides the proceeding to the sleep mode in accordance with the manipulation by the user, or the like (Step S912), and supplies the power source off request to the power source managing unit 240. The power source managing unit 240 turns off the power sources of the processor 221, and the like in response to the power source off request (Step S921). Then, the power source managing unit 240 controls the selector 260 to cause the selector 260 to be switched over to the power source managing unit 240 side (Step S922).

The power source managing unit 240 supplies the at-the-time-of-proceeding to sleep control command to the power source managing integrated circuit 110. The power source managing integrated circuit 110 reduces the power source voltage VDD1 to the main chip 200 in accordance with the at-the-time-of-proceeding to sleep control command (Step S934).

Then, when the external interrupt signal is inputted from the sensor device 120 to the power source managing unit 240, the power source managing unit 240 generates the at-the-time-of-returning control command, and supplies the at-the-time-of-returning control command to the power source managing integrated circuit 110. The power source managing integrated circuit 110 increases the power source voltage VDD1 to the main chip 200 in accordance with the at-the-time-of-returning control command (Step S935). Then, the power source managing unit 240 turns on the power sources of the processor 221 and the like (Step S924), and controls the selector 260 to cause the selector 260 to be switched over to the processor 221 side (Step S925).

In such a manner, according to the first embodiment of the present technology, since in the sleep mode, the power source managing unit 240 generates the control command to increase or decrease the supply electric powers to the sensor device 120 and the like, the power consumption can be reduced without reducing the function.

2. Second Embodiment

In the first embodiment described above, in the sleep mode, the circuit within the main chip 200 is caused to operate on the basis of the same clock signal as that in the normal mode. However, if the sleep mode, a clock frequency of the clock signal is reduced, then, the power consumption can be further reduced. An electronic apparatus 100 of the second embodiment is different from that of the first embodiment in that the clock frequency of the clock signal is controlled.

Figure 8:
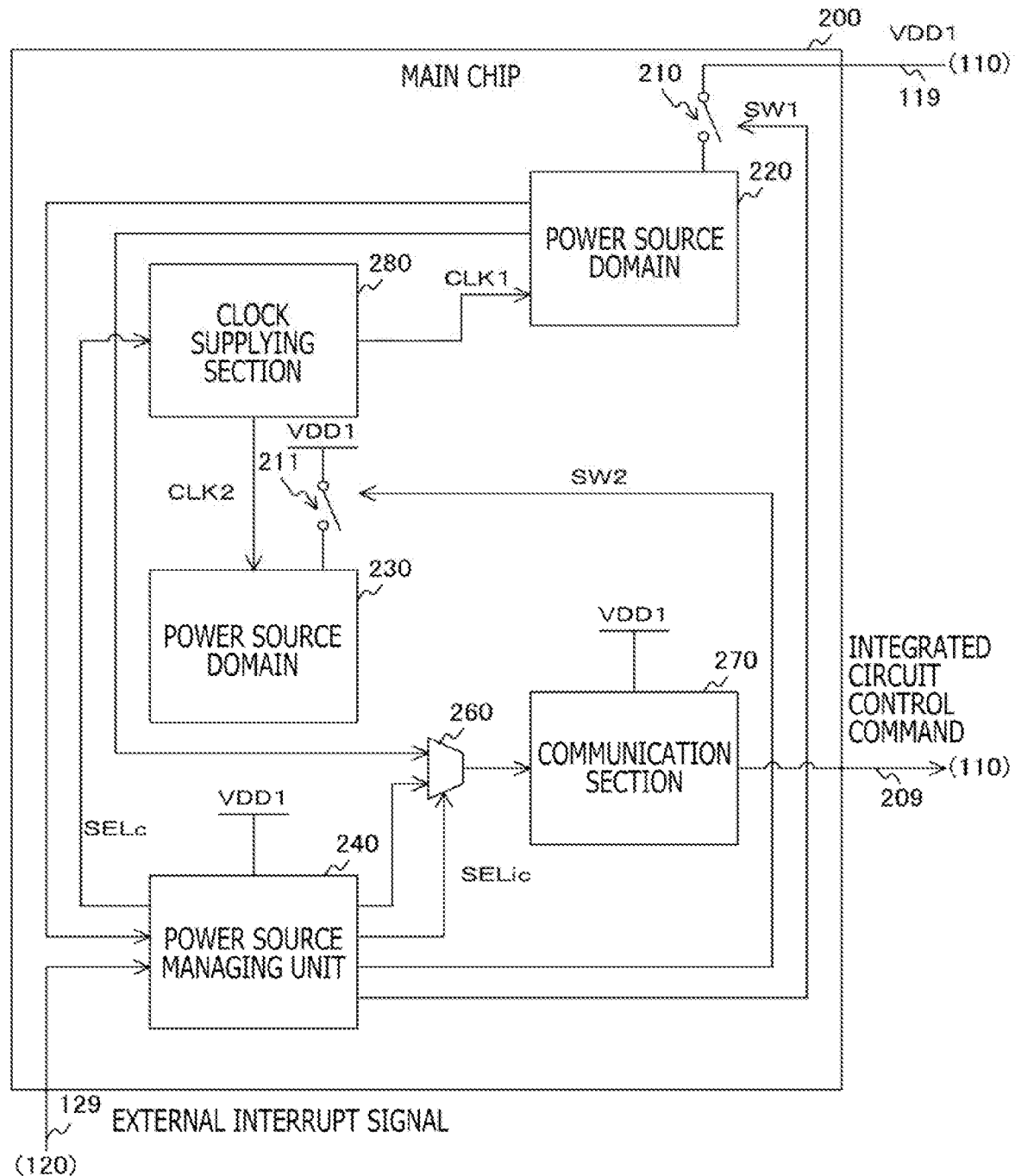
FIG. 8 is a block diagram an example of a configuration of a main chip in a second embodiment of the present technology.

FIG. 8 is a block diagram illustrating an example of a configuration of a main chip 200 in the second embodiment of the present technology. The main chip 200 in the second embodiment is different from that in the first embodiment in that the main chip 200 is further provided with a clock supplying section 280.

The clock supplying section 280 supplies clock signals to the power source domains 220 and 230, respectively. Specifically, the clock supplying section 280 supplies a clock signal CLK1 to the power source domain 220, and supplies a clock signal CLK2 to the power source domain 230. In addition, the clock supplying section 280 switches a frequency of the clock signal CLK1 over to one of different two values in accordance with the selection signal SELc.

Figure 9:
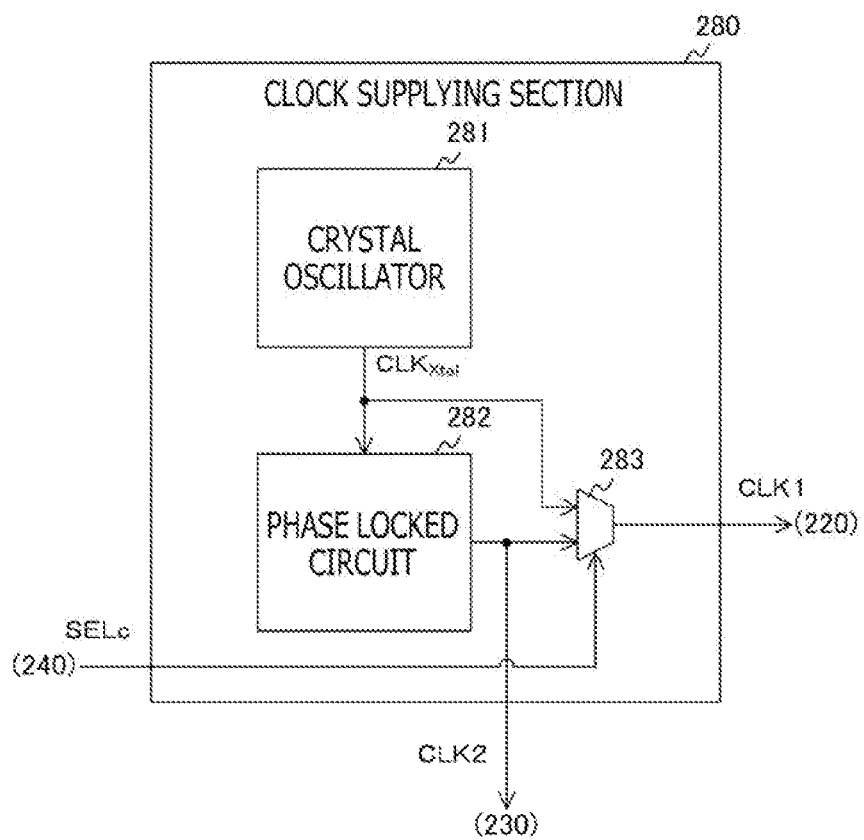
FIG. 9 is a block diagram an example of a configuration of a clock supplying section in the second embodiment of the present technology.

FIG. 9 is a block diagram illustrating an example of a configuration of the clock supplying section 280 in the second embodiment of the present technology. The clock supplying section 280 is provided with a crystal oscillator 281, a phase locked circuit 282, and a selector 283.

The crystal oscillator 281 generates a clock signal $CLK_{xtal}$ having a predetermined frequency, and supplies the clock signal $CLK_{xtal}$ to each of the phase locked circuit 282 and the selector 283.

The phase locked circuit 282 multiplies the frequency of the clock signal $CLK_{xtal}$ at a predetermined multiplication ratio. The phase locked circuit 282 supplies a clock signal CLK2 after the multiplication to each of the selector 283 and the power source domain 230.

The selector 283 selects one of the clock signals $CLK_{xtal}$ and CLK2 in accordance with the selection signal SELc, and outputs the selected one as the clock signal CLK1 to the power source domain 220.

Figure 10:
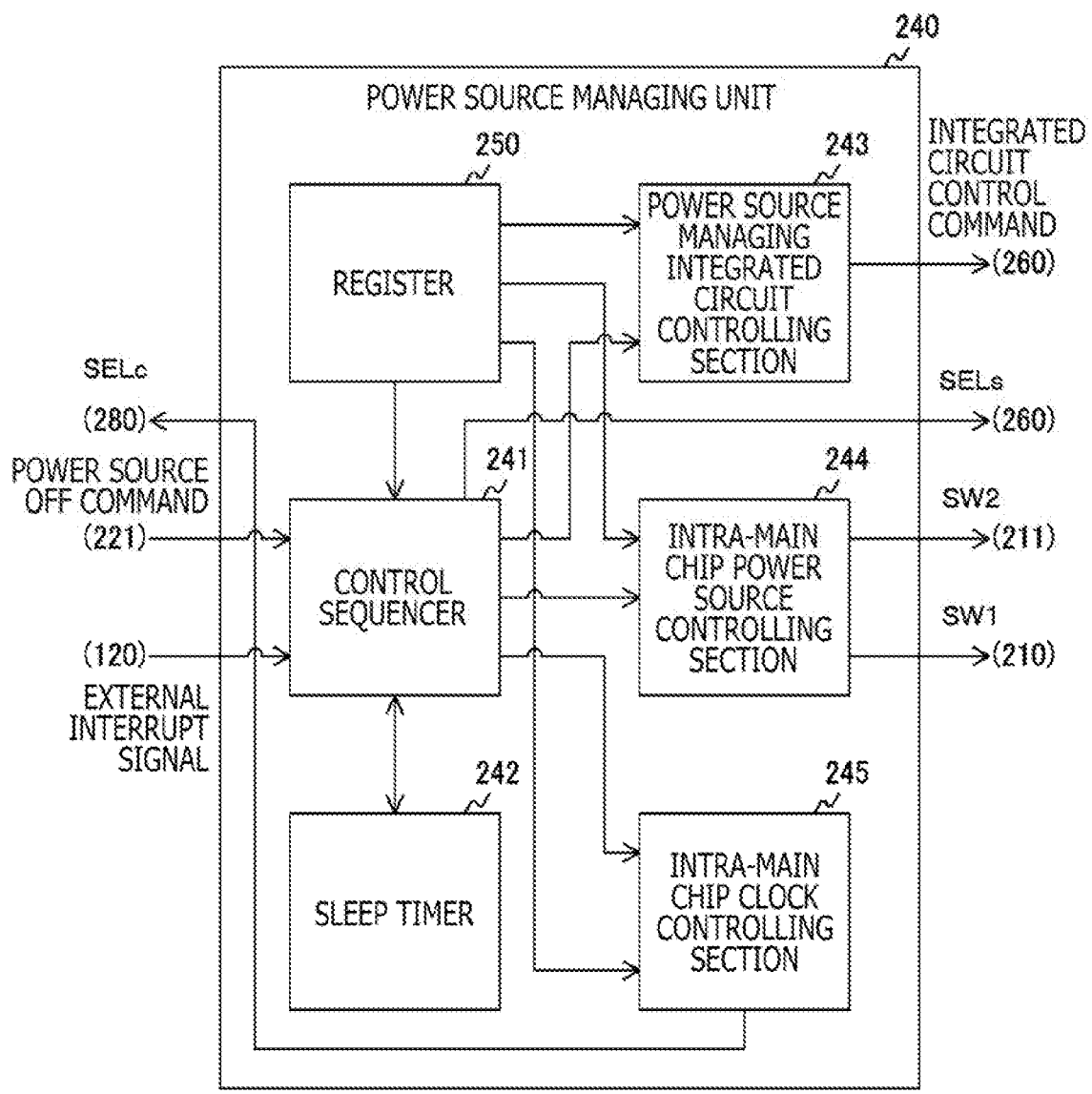
FIG. 10 is a block diagram an example of a configuration of a power source managing unit in the second embodiment of the present technology.

FIG. 10 is a block diagram illustrating an example of a configuration of a power source managing unit 240 in the second embodiment of the present technology. The power source managing unit 240 in the second embodiment is different from that in the first embodiment in that the power source managing unit 240 is further provided with an intra-main chip clock controlling section 245.

The intra-main chip clock controlling section 245 controls the frequency of the clock signal CLK1 in accordance with the set information in the register 250. For example, whether or not the frequency of the clock signal CLK1 is reduced in the sleep mode is set in the set information.

In the case where the effect that the frequency of the clock signal CLK1 is reduced is set in the sleep mode, the intra-main chip clock controlling section 245 controls the clock supplying section 280 in accordance with the selection signal SELc at the time of the proceeding to the sleep mode to cause the clock supplying section 280 to select the clock signal $CLK_{xtal}$ having the lower frequency. Then, at the time of the return to the normal mode, the intra-main chip clock controlling section 245 controls the clock supplying section 280 in accordance with the selection signal SELc to cause the clock supplying section 280 to select the clock signal CLK2 having the higher frequency.

At the time of the return, the intra-main chip clock controlling section 245 increases the clock frequency of the clock signal CLK2, thereby enabling the reactivation of the processor 221 to be speeded up.

It should be noted that although at the time of the proceeding to the sleep mode, the intra-main chip clock controlling section 245 reduces the clock frequency of the clock signal CLK1 supplied to the processor 221, the intra-main chip clock controlling section 245 may stop the supply of the clock signal itself to the processor 221. In this case, the intra-main chip clock controlling section 245 generates an enable signal representing whether or not the supply of the clock signal CLK1 itself is stopped, and supplies the enable signal to the clock supplying section 280.

Figure 11:
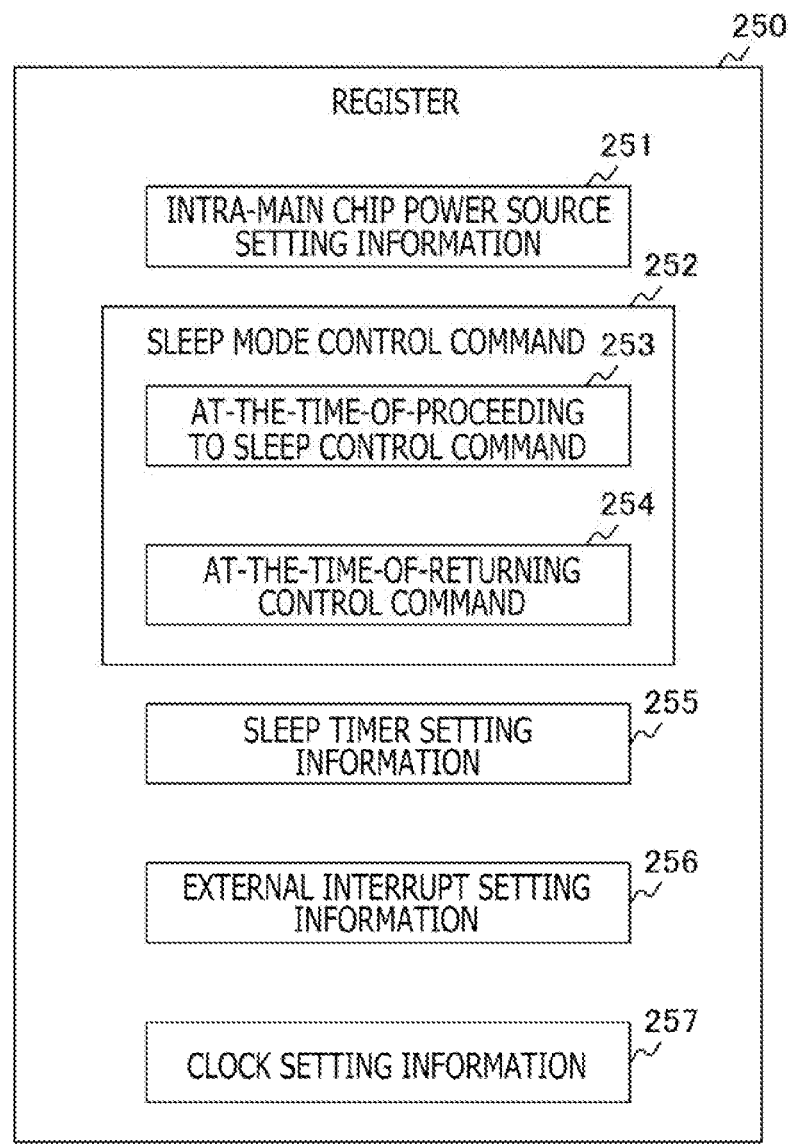
FIG. 11 is a diagram illustrating an example of data held in a register in the second embodiment of the present technology.

FIG. 11 is a diagram illustrating an example of the data held in the register 250 in the second embodiment of the present technology. The register 250 in the second embodiment further holds clock setting information 257. The clock setting information 257 is information representing whether or not the frequency is reduced in the sleep mode.

In such a manner, since in the second embodiment of the present technology, in the sleep mode, the power source managing unit 240 reduces the frequency of the clock signal, the power consumption in the sleep mode can be further reduced.

3. Third Embodiment

In the first embodiment described above, for reducing the power consumption, the electronic apparatus 100 stops the operation of the sensor device 120 in the sleep mode, so that the data associated with the sensor device 120 is not collected. However, there is the possibility that if the sensor device 120 is stopped in the sleep mode, then, the processing using the periodically collected data becomes difficult to execute. For example, let us consider the case where a GPS (Global Positioning System) sensor is used as the sensor device 120, and a locus along which the electronic apparatus 100 moves is obtained by using the position information from the GPS sensor. In this case, if the collection of the position information is paused in the sleep mode, then, the locus becomes imperfect. In such a case, even when the power consumption increases for the sensor device 120, as long as the entire power consumption can be sufficiently reduced due to the reduction of the power source voltage, even during the sleep mode, the power source of the sensor device 120 is turned on, and the electronic apparatus 100 desirably collects the data. An electronic apparatus 100 of the third embodiment is different from that of the first embodiment in that even during the sleep mode, the electronic apparatus 100 collects the data from the sensor device 120.

Figure 12:
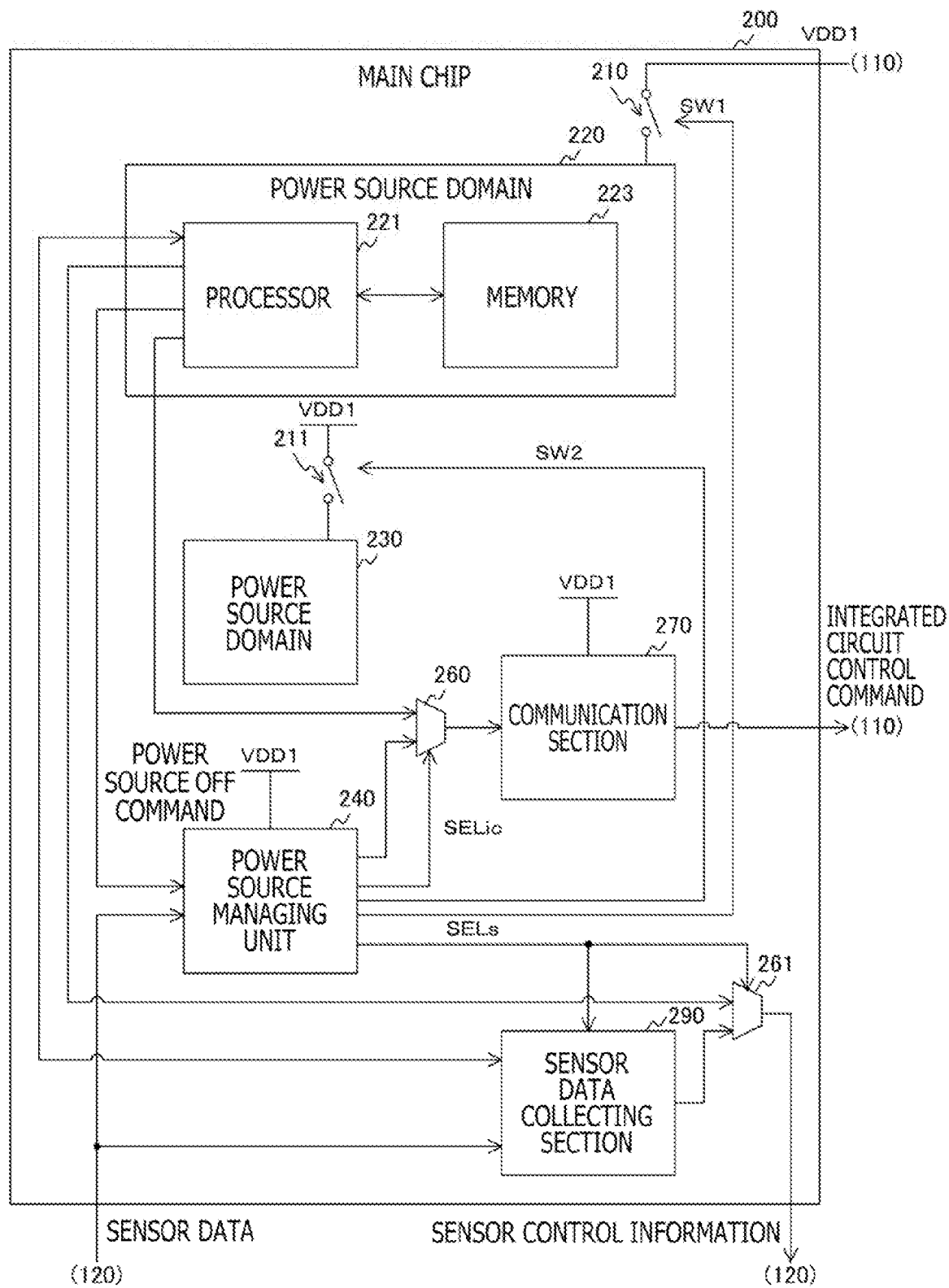
FIG. 12 is a block diagram illustrating an example of a configuration of a main chip in a third embodiment of the present technology.

FIG. 12 is a block diagram illustrating an example of a configuration of a main chip 200 in the third embodiment of the present technology. The main chip 200 of the third embodiment is different from that of the first embodiment in that the main chip 200 of the third embodiment is further provided with a sensor data collecting section 290 and a selector 261.

In addition, at the time of the proceeding to the sleep mode, the power source managing unit 240 of the third embodiment controls the selector 261 in accordance with the selection signal SELs to cause the selector 261 to select the sensor control signal from the sensor data collecting section 290. The sensor control signal is the information used to control the operation of the sensor device 120. The sensor control signal includes the information instructing a sampling frequency, the enable signal instructing start or stop of the operation, and the like.

In addition, at the time of the returning to the normal mode, the power source managing unit 240 controls the selector 261 in accordance with the selection signal SELs to cause the selector 261 to select the sensor control signal from the processor 221. The selection signal SELs is also supplied to the sensor data collecting section 290.

The sensor data collecting section 290 collects the sensor data generated by the sensor device 120 in the sleep mode. The sensor data collecting section 290 generates a sensor control signal in the sleep mode, and supplies the server control signal to the selector 261. In addition, the sensor data collecting section 290 acquires the sensor data generated by the sensor device 120 in response to the sensor control signal, and holds the sensor data thus acquired.

The processor 221 in the third embodiment generates sensor control information in the normal mode, and supplies the resulting sensor control information to the selector 261. In addition, the processor 221 generates sensor collection setting information, and outputs the resulting sensor collection setting information to the sensor data collecting section 290. The sensor collection setting information is information used to control the operation of the sensor data collecting section 290 during the sleep mode. The sensor collection setting information, for example, includes an enable signal representing whether or not the collection of the sensor data continues, the set value of the sampling frequency, and the like. In addition, when the operation mode returns from the sleep mode to the normal mode, the processor 221 reads out the sensor data during the sleep mode from the sensor data collecting section 290, and processes the sensor data thus read out.

The selector 261 selects, in accordance with the selection signal SELs, one of the sensor control signal from the processor 221, and the sensor control information from the sensor data collecting section 290, and outputs the selected one to the sensor device 120.

It should be noted that although the power source managing unit 240 switches the selector 261, instead of the power source managing unit 240, the processor 221 can also switch the selector 261.

In addition, although the sensor data collecting section 290 does not output the interrupt signal for causing the operation mode to return to the normal mode, when the sensor data whose number of pieces is equal to or larger than a predetermined threshold value is collected, an intra-chip interrupt signal may be outputted to the power source managing unit 240. When the intra-chip interrupt signal is inputted to the power source managing unit 240, the power source managing unit 240 determines that the returning condition is fulfilled.

Figure 13:
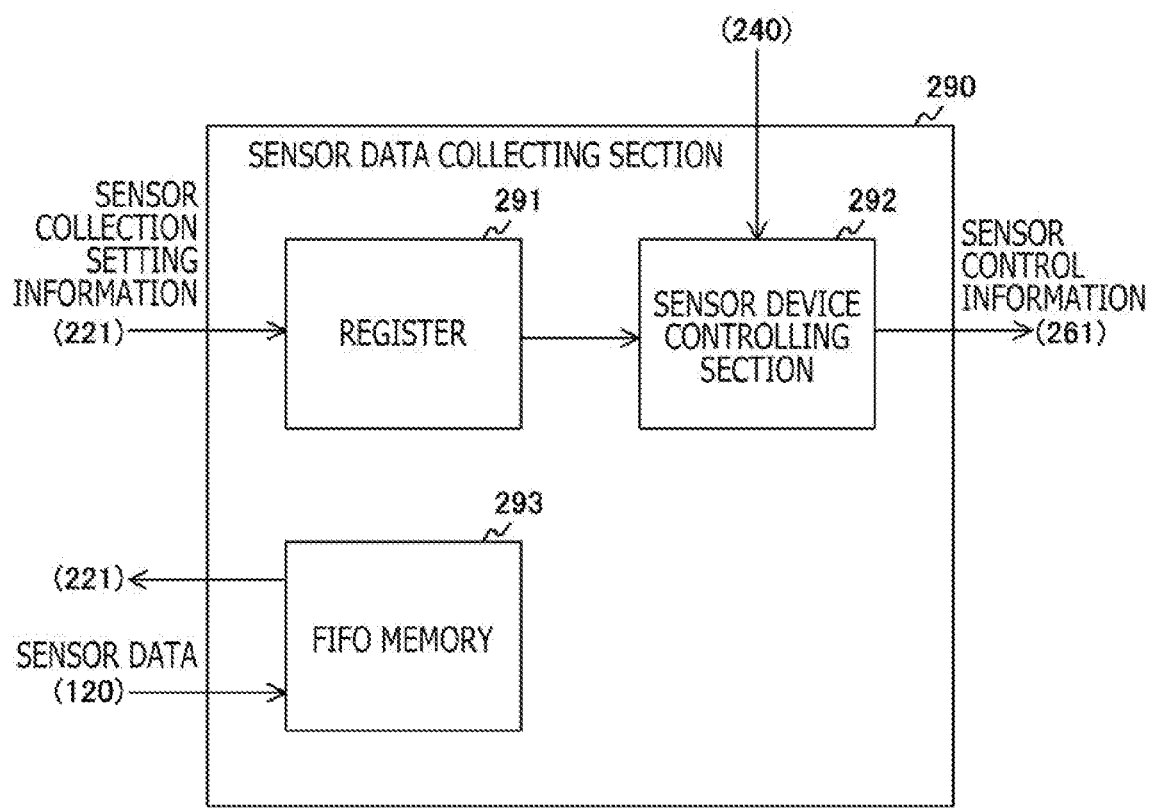
FIG. 13 is a block diagram illustrating an example of a configuration of a sensor data collecting section in the third embodiment of the present technology.

FIG. 13 is a block diagram illustrating an example of a configuration of the sensor data collecting section 290 in the third embodiment of the present technology. The sensor data collecting section 290 is provided with a register 291, a sensor device controlling section 292, and a FIFO (First In, First Out) memory 293.

The register 291 holds sensor collection setting information from the processor 221. The sensor device controlling section 292 generates a sensor control signal during the sleep mode in accordance with the sensor collection setting information. The FIFO memory 293 holds the sensor data in a first in, first out system.

In such a way, since in the third embodiment of the present technology, the sensor data collecting section 290 collects the sensor data in the sleep mode, the convenience of the electronic apparatus 100 can be enhanced by the application which continuously collects and processes the sensor data.

4. Application Examples

The technology pertaining to the present disclosure can be applied to the technology called IoT as the so-called "internet of things." IoT means a construction in which an IoT device 9100 as a "thing" is connected to other IoT device 9003, the Internet, a cloud 9005, or the like, and the information exchange is performed between them, thereby performing the inter control. IoT can be utilized in various industries such as the agriculture, the house, the automobile, the manufacture, the distribution, and the energy.

Figure 14:
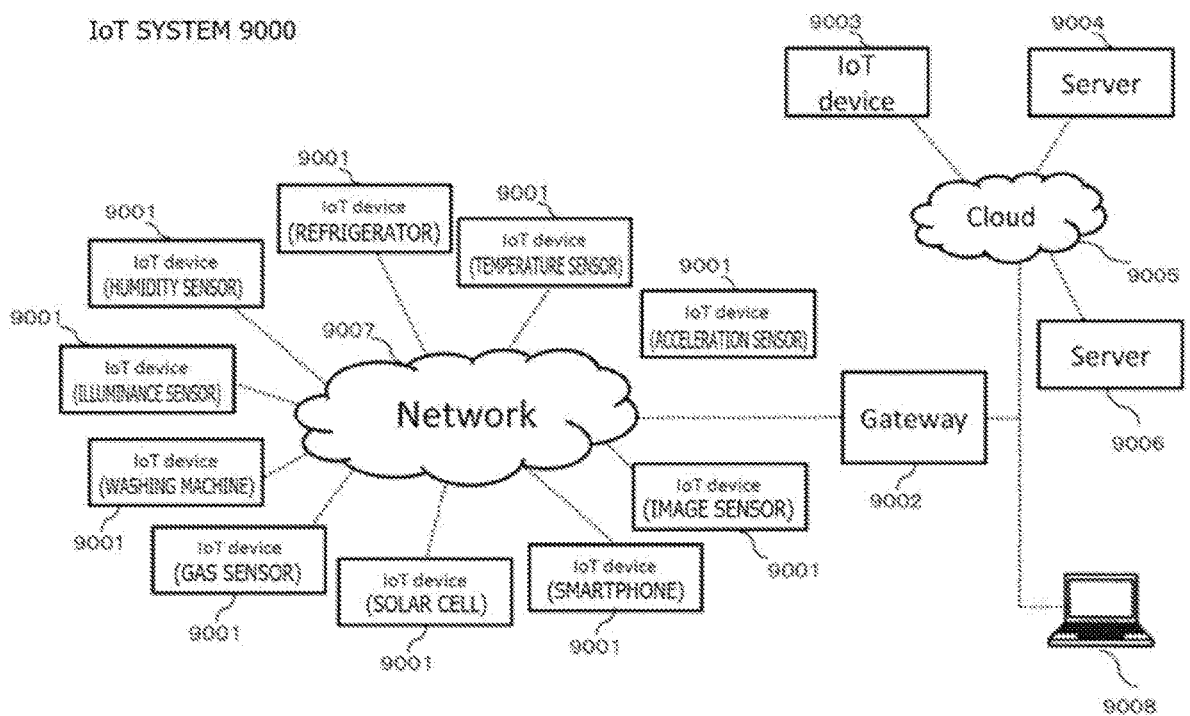
FIG. 14 is a diagram illustrating an example of a schematic configuration of an IoT system 9000 to which the technology according to an embodiment of the present disclosure may be applicable.

FIG. 14 is a diagram illustrating an example of a schematic configuration of an IoT system 9000 to which the technology according to an embodiment of the present disclosure is applicable.

The IoT devices 9001 include a variety of sensors such as temperature, humidity, illuminance, acceleration, distance, image, gas, and human sensors. Further, the IoT devices 9001 may additionally include terminals such as a smartphone, a mobile phone, a wearable terminal, and a gaming device. The IoT devices 9001 are powered, for example, by an alternating current (AC) power supply, a direct current (DC) power supply, a battery, a non-contact power supply, energy harvesting, or the like. The IoT devices 9001 are capable, for example, of wired, wireless, and short-range wireless communication. Communication schemes suitably used are third-generation (3G)/LTE, wireless fidelity (Wi-Fi), institute of electrical and electronic engineers (IEEE) 802.15.4, Bluetooth, Zigbee, and Z-Wave. The IoT devices 9001 may switch between the plurality of these communication sections to achieve communication.

The IoT devices 9001 may form one-to-one, star, tree, and mesh networks. The IoT devices 9001 may connect to the external cloud 9005 directly or via a gateway 9002. An address is assigned to each of the IoT devices 9001, for example, by internet protocol version (IPv) 4, IPv6, or IPv6 over low power wireless personal area networks (6LowPAN). Data collected from the IoT devices 9001 is sent to the other IoT device 9003, a server 9004, the cloud 9005, and so on. The timings and frequency for sending data from the IoT devices 9001 may be suitably adjusted for transmission of data in a compressed form. Such data may be used in an 'as-is' manner or analyzed by a computer 9008 by various sections such as statistical analysis, machine learning, data mining, cluster analysis, discriminant analysis, combinational analysis, and chronological analysis. Such use of data enables provision of numerous services including control, warning, monitoring, visualization, automation, and optimization.

The technology according to an embodiment of the present disclosure is also applicable to home-related devices and services. The IoT devices 9001 in homes include washing machine, drying machine, dryer, microwave oven, dish washing machine, refrigerator, oven, electric rice cooker, cooking appliances, gas appliances, fire alarm, thermostat, air-conditioner, television (TV) set, recorder, audio appliances, lighting appliances, electric water heater, hot water dispenser, vacuum cleaner, electric fan, air purifier, security camera, lock, door-shutter opener/closer, sprinkler, toilet, thermometer, weighing scale, sphygmomanometer and the like. Further, the IoT devices 9001 may include solar cell, fuel cell, storage battery, gas meter, electric power meter, and distribution panel.

A low power consumption communication scheme is desirable as a communication scheme for the IoT devices 9001 in homes. Further, the IoT devices 9001 may communicate by Wi-Fi indoors and by 3G/LTE outdoors. An external server 9006 designed to control IoT devices may be provided on the cloud 9005 to control the IoT devices 9001. The IoT devices 9001 send data including statuses of home appliances, temperature, humidity, power consumption, and presence or absence of humans and animals indoors and outdoors. Data sent from the home appliances is accumulated in the external server 9006 via the cloud 9005. New services are made available based on such data. The IoT devices 9001 designed as described above can be controlled by voice using voice recognition technologies.

In addition, direct transmission of information from the home appliances to the TV set permits visualization of the statuses of the home appliances. Further, determination of whether or not the resident is at home and transmission of data to air-conditioners and lighting appliances by various sensors makes it possible to turn the power thereof on and off. Still further, advertisements can be shown on the displays provided to various home appliances via the Internet.

An example of the IoT system 9000 to which the technology pertaining to the present disclosure can be applied has been described so far. The technology pertaining to the present disclosure can be suitably applied to the IoT device 9001 of the configurations described so far. Specifically, the technology pertaining to the present disclosure is applied to the IoT device 9001, thereby enabling the power consumption to be reduced without reducing the function.

It should be noted that the above embodiments depict an example for embodying the present technology, and the matters in the embodiments and the invention specific matters in CLAIMS have the correspondence relationship. Likewise, the invention specific matters in CLAIMS and the matters, in the embodiments of the present technology, given the same names have the correspondence relationship. However, the present technology is by no means limited to the embodiments, and various changes are made for the embodiments without departing from the subject matter, thereby enabling the present technology to be embodied.

In addition, the processing procedures described in the above embodiments may be grasped as a method having these series of procedures, or may be grasped as a program causing a computer to execute these series of procedures, or a recording medium storing the program. For example, a CD (Compact Disc), an MD (MiniDisc), a DVD (Digital Versatile Disc), a memory card, a Blu-ray (registered trademark) disc, or the like can be used as the recording medium.

It should be noted that the effects described in the present description are merely an exemplification and are by no means limited, and other effects may also be offered.

It should be noted that the present technology can also adopt the following configurations.

(1)

An electronic apparatus, including:

a processor operating in a normal mode in which power consumption is higher, of two modes different in power consumption from each other, and stopping operation in a power saving mode in which the power consumption is lower, of the two modes;

a control section outputting a power saving mode control command instructing an increase or decrease of a supply electric power to a digital circuit different from the processor in the power saving mode; and a power source managing integrated circuit increasing or decreasing the supply electric power to the digital circuit in accordance with the power saving mode control command, and outputting the increased or decreased supply electric power.

(2)

The electronic apparatus according to (1) described above, in which the control section outputs the power saving mode control command instructing supply or cut-off of the supply electric power.

(3)

The electronic apparatus according to (1) or (2) described above, in which the power source managing integrated circuit outputs an electric power responding to a power source voltage as the supply electric power, and the control section outputs the control command instructing an increase or decrease of a voltage value of the power source voltage.

(4)

The electronic apparatus according to any one of (1) to (3) described above, in which the processor outputs a normal mode control command instructing an increase or decrease of a supply electric power to the processor and the digital circuit in the normal mode, and the power source managing integrated circuit increases or decreases the supply electric power to the processor and the digital circuit in accordance with one of the normal mode control command and the power saving mode control command.

(5)

The electronic apparatus according to (4) described above, further including:

a selector selecting the normal mode control command in the normal mode and outputting the normal mode control command to the power source managing integrated circuit, and selecting the power saving mode control command in the power saving mode and outputting the power saving mode control command to the power source managing integrated circuit.

(6)

The electronic apparatus according to any one of (1) to (5) described above, in which the control section, in a case where an operation of the processor stops, outputs a command instructing a decrease of the supply electric power as the power saving mode control command, and in a case where a predetermined returning condition for returning to the normal mode is fulfilled, outputs a command instructing an increase of the supply electric power as the power saving mode control command.

(7)

The electronic apparatus according to any one of (1) to (6) described above, further including:

a register holding the power saving mode control command, in which the control section reads out the power saving mode control command from the register.

(8)

The electronic apparatus according to any one of (1) to (7) described above, further including:

a clock supplying section supplying a clock signal to the processor, in which the control section controls a frequency of the clock signal in the power saving mode.

(9)

The electronic apparatus according to any one of (1) to (8) described above, further including:

a sensor data collecting section collecting sensor data from the digital circuit in the power saving mode, in which the digital circuit includes a sensor device generating the sensor data.

(10)

A method of controlling an electronic apparatus, including:

a processing procedure in which a processor operates in a normal mode in which power consumption is higher, of two modes different in power consumption from each other, and stops operation in a power saving mode in which the power consumption is lower, of the two modes;

a control procedure in which a control section outputs a power saving mode control command instructing an increase or decrease of a supply electric power to a digital circuit different from the processor in the power saving mode; and an output procedure in which a power source managing integrated circuit increases or decreases the supply electric power to the digital circuit in accordance with the power saving mode control command, and outputs the increased or decreased supply electric power.

REFERENCE SIGNS LIST

100 Electronic apparatus
110 Power source managing integrated circuit
111 Voltage control section
112 Control command holding section
113 Communication section
114, 210, 211 Switch
120 Sensor device
130 Battery
200 Main chip
220, 230 Power source domain
221 Processor
222 Memory
240 Power source managing unit
241 Control sequencer
242 Sleep timer
243 Power source managing integrated circuit controlling section
244 Intra-main chip power source controlling section
245 Intra-main chip clock controlling section
250, 291 Register
260, 261, 283 Selector
270 Communication section
280 Clock supplying section
281 Crystal oscillator
282 Phase locked circuit
290 Sensor data collecting section
292 Sensor device controlling section
293 FIFO memory
9001 IoT device

The invention claimed is:

1. An electronic apparatus, comprising:
processing circuit operating in a normal mode in which power consumption is higher, of two modes different in power consumption from each other, and stopping operation in a power saving mode in which the power consumption is lower, of the two modes, the processing circuitry including a processor and a control section that is configured to output a power saving mode control command instructing an increase or decrease of a supply of electric power to a digital circuit different from the processor in the power saving mode; and
a power source managing integrated circuit increasing or decreasing the supply of the electric power to the digital circuit in accordance with the power saving mode control command, and outputting the increased or decreased supply of the electric power.

2. The electronic apparatus according to claim 1, wherein the control section outputs the power saving mode control command instructing supply or cut-off of the supply of the electric power.

3. The electronic apparatus according to claim 1, wherein the power source managing integrated circuit outputs an electric power responding to a power source voltage as the supply of the electric power, and
the control section outputs the power saving mode control command instructing an increase or decrease of a voltage value of the power source voltage.

4. The electronic apparatus according to claim 1, wherein the control section configured to output a normal mode control command instructing an increase or decrease of a second supply of a second electric power to the processor and the digital circuit in the normal mode, and
the power source managing integrated circuit increases or decreases the second supply of the second electric power to the processor and the digital circuit in accordance with one of the normal mode control command.

5. The electronic apparatus according to claim 4, wherein the processing circuitry further includes a selector selecting the normal mode control command in the normal mode and outputting the normal mode control command to the power source managing integrated circuit, and selecting the power saving mode control command in the power saving mode and outputting the power saving mode control command to the power source managing integrated circuit.

6. The electronic apparatus according to claim 1, wherein the control section, in a case where an operation of the processor stops, outputs a first command instructing a decrease of the supply of the electric power as the power saving mode control command, and in a case where a predetermined returning condition for returning to the normal mode is fulfilled, outputs a second command instructing an increase of the supply of the electric power as the power saving mode control command.

7. The electronic apparatus according to claim 1, wherein the processing circuitry further includes a register holding the power saving mode control command,
wherein the control section reads out the power saving mode control command from the register.

8. The electronic apparatus according to claim 1, wherein the processing circuitry further includes a clock supplying section supplying a clock signal,
wherein the control section controls a frequency of the clock signal in the power saving mode.

9. The electronic apparatus according to claim 1, wherein the processing circuitry further includes
a sensor data collecting section collecting sensor data from the digital circuit in the power saving mode,
wherein the digital circuit includes a sensor device generating the sensor data.

10. A method of controlling an electronic apparatus, the method comprising:
determining, with a control section of a processing circuitry, whether a processor of the processing circuitry operates in a normal mode in which power consumption is higher, of two modes different in power consumption from each other, and stops operation in the normal mode to switch to a power saving mode in which the power consumption is lower, of the two modes;
outputting, with the control section, a power saving mode control command instructing an adjustment in a supply of electric power to a digital circuit different from the processor; and
adjusting, with a power source managing integrated circuit, the supply of electric power to the digital circuit in accordance with the power saving mode control command; and
outputting, with the power source managing integrated circuit, the supply of electric power that is adjusted to the digital circuit.

11. The method according to claim 10, wherein the adjustment is a supply of or a cut-off of the supply of electric power.

12. The method according to claim 10, further comprising:
receiving, with the power source managing integrated circuit, an electric power from a power source voltage,
wherein the power saving mode control command is an instruction that controls the power source managing integrated circuit to adjust a voltage value of the electric power that is received from the power source voltage.

13. The method according to claim 10, further comprising:
outputting, with the control section, a normal mode control command instructing a second supply of a second electric power to the processor and the digital circuit,
increasing or decreasing, with the power source managing integrated circuit, the second supply of the second electric power to the processor and the digital circuit in accordance with one of the normal mode control command.

14. The method according to claim 13, further comprising:
determining, with the control section, whether the processor is operating in the normal mode or the power saving mode;
controlling, with the control section, a selector to select the normal mode control command and output the normal mode control command to the power source managing integrated circuit in response to determining that the processor is operating in the normal mode; and
controlling, with the control section, the selector to select the power saving mode control command and output the power saving mode control command to the power source managing integrated circuit in response to determining that the processor is operating in the power saving mode.

15. The method according to claim 10, further comprising:
determining, with the control section, whether the operation of the processor is stopped in the normal mode;
outputting, with the control section, a first command instructing a decrease of the supply of electric power as the power saving mode control command;
determining, with the control section, a predetermined returning condition for returning the processor to the normal mode; and
outputting, with the control section, a second command instructing an increase of the supply of electric power as the power saving mode control command.

16. The method according to claim 10, further comprising:
holding, with a register of the processing circuitry, the power saving mode control command; and
retrieving, with the control section, the power saving mode control command from the register.

17. The method according to claim 10, further comprising:
supplying, with a clock supplying section of the processing circuitry, a clock signal to the processor; and
controlling, with the control section, a frequency of the clock signal.

18. The method according to claim 10, further comprising:
determining, with the control section, whether the processor is in the normal mode or the power saving mode; and controlling, with the control section, a sensor data collecting section to collect sensor data from the digital circuit in response to determining that the processor is in the power saving mode,
wherein the digital circuit includes a sensor device generating the sensor data.

* * * * *